(12) United States Patent
Winters et al.

(10) Patent No.: US 6,918,611 B1
(45) Date of Patent: Jul. 19, 2005

(54) SYSTEM AND METHOD FOR CONTROLLING AN INFLATABLE CUSHION

(75) Inventors: Mark T. Winters, Troy, OH (US); Laura A. Hawthorn, Tipp City, OH (US); Stephanie Dunkle, Springboro, OH (US); Ryan T. Pinsenschaum, Vandalia, OH (US); Ann L. Kneisly, Dayton, OH (US); Patrick Schatz, Lebanon, OH (US)

(73) Assignee: Delphi Technologies, Inc., Troy, MI (US)

( * ) Notice: Subject to any disclaimer, the term of this patent is extended or adjusted under 35 U.S.C. 154(b) by 151 days.

(21) Appl. No.: 10/223,886

(22) Filed: Aug. 20, 2002

Related U.S. Application Data

(63) Continuation-in-part of application No. 09/951,809, filed on Sep. 13, 2001, now Pat. No. 6,736,426, which is a continuation-in-part of application No. 09/672,474, filed on Sep. 28, 2000, now Pat. No. 6,422,597.

(60) Provisional application No. 60/371,545, filed on Apr. 10, 2002, provisional application No. 60/343,844, filed on Dec. 27, 2001.

(51) Int. Cl.[7] .............................................. B62D 21/32
(52) U.S. Cl. .................... 280/735; 280/739; 280/743.2
(58) Field of Search ............................... 280/739, 735, 280/741, 742, 736, 743.2

(56) References Cited

U.S. PATENT DOCUMENTS

| | | | |
|---|---|---|---|
| 4,243,248 A | 1/1981 | Scholz et al. ............... | 280/735 |
| 5,074,583 A | 12/1991 | Fujita et al. ................ | 280/735 |
| 5,219,178 A | 6/1993 | Kobari et al. ............... | 280/736 |
| 5,330,226 A * | 7/1994 | Gentry et al. ............... | 280/735 |
| 5,348,343 A | 9/1994 | Hawthorn ................... | 280/730 |
| 5,398,185 A | 3/1995 | Omura .................. | 364/424.05 |
| 5,411,289 A | 5/1995 | Smith et al. ................ | 280/735 |
| 5,413,378 A * | 5/1995 | Steffens et al. ............. | 280/735 |
| 5,454,591 A | 10/1995 | Mazur et al. ............... | 280/735 |
| 5,460,405 A * | 10/1995 | Faigle et al. ................ | 280/735 |
| 5,468,014 A | 11/1995 | Gimbel et al. .............. | 280/735 |
| 5,474,327 A | 12/1995 | Schousek .................... | 280/735 |
| 5,490,069 A | 2/1996 | Gioutsos et al. ........ | 364/424.05 |
| 5,560,648 A | 10/1996 | Rhule et al. ................ | 280/731 |
| 5,570,903 A | 11/1996 | Meister et al. .............. | 280/735 |

(Continued)

FOREIGN PATENT DOCUMENTS

| | | | | |
|---|---|---|---|---|
| EP | 0829398 | 8/1997 | ........... | B60R 21/32 |
| FR | 2761032 | 9/1998 | | |
| WO | WO 9836950 | 2/1998 | ........... | B60R 21/32 |
| WO | WO 01/34436 | 5/2001 | | |

OTHER PUBLICATIONS

Copy of EP Search Report dated Oct. 15, 2003.

*Primary Examiner*—Eric Culbreth
(74) *Attorney, Agent, or Firm*—Scott A. McBain

(57) ABSTRACT

An air bag pressure control system for use in a vehicle is provided. The system comprises a housing, an inflatable cushion, and a dual stage inflator. The inflator generates a quantity of inflation gas to deploy the inflatable cushion from the housing. A vent opening is formed in the housing to selectively direct a portion of the inflation gas towards or away from the inflatable cushion. A sensing and diagnostic module detects an activation event level. A control algorithm tailors an inflation level of the inflatable cushion during deployment according to the activation event level.

16 Claims, 7 Drawing Sheets

U.S. PATENT DOCUMENTS

| | | | |
|---|---|---|---|
| 5,573,269 A | 11/1996 | Gentry et al. | 280/735 |
| 5,605,346 A | 2/1997 | Cheung et al. | 280/728.2 |
| 5,605,350 A | 2/1997 | Bates et al. | 280/743.1 |
| 5,613,702 A | 3/1997 | Goetz | 280/735 |
| 5,626,359 A | 5/1997 | Steffens, Jr. et al. | 280/735 |
| 5,630,614 A | 5/1997 | Conlee et al. | 280/730.1 |
| 5,636,862 A | 6/1997 | Cheung et al. | 280/730.2 |
| 5,636,864 A | 6/1997 | Hori | 280/735 |
| 5,732,375 A | 3/1998 | Cashler | 701/45 |
| 5,796,177 A | 8/1998 | Werbelow et al. | 307/10.1 |
| 5,803,491 A | 9/1998 | Barnes et al. | 280/735 |
| 5,821,633 A | 10/1998 | Burke et al. | 307/10.1 |
| 5,831,342 A | 11/1998 | Vivacqua et al. | 307/10.1 |
| 5,871,231 A | 2/1999 | Richards et al. | 280/735 |
| 5,880,534 A | 3/1999 | Mossi et al. | 307/10.1 |
| 5,887,894 A | 3/1999 | Castagner et al. | 280/743.2 |
| 5,967,549 A | 10/1999 | Allen et al. | 280/735 |
| 5,997,033 A | 12/1999 | Gray et al. | 280/735 |
| 6,007,094 A | 12/1999 | Hosoda | 280/735 |
| 6,039,346 A | 3/2000 | Ryan et al. | 280/736 |
| 6,076,854 A | 6/2000 | Schenck et al. | 280/743.2 |
| 6,099,032 A | 8/2000 | Cuddihy et al. | 280/735 |
| 6,106,010 A | 8/2000 | Forbes et al. | 280/741 |
| 6,123,358 A | 9/2000 | Ryan et al. | 280/739 |
| 6,139,055 A | 10/2000 | Dahl et al. | 280/741 |
| 6,149,193 A | 11/2000 | Canterberry et al. | 280/741 |
| 6,161,866 A | 12/2000 | Ryan et al. | 280/736 |
| 6,199,901 B1 | 3/2001 | Iizuka | 280/735 |
| 6,199,906 B1 | 3/2001 | Trevillyan et al. | 280/741 |
| 6,203,061 B1 | 3/2001 | Niederman et al. | |
| 6,213,502 B1 | 4/2001 | Ryan et al. | 280/736 |
| 6,247,726 B1 | 6/2001 | Ryan | 280/739 |
| 6,250,671 B1 | 6/2001 | Osmer et al. | 280/735 |
| 6,250,677 B1 | 6/2001 | Fujimura | 280/743.2 |
| 6,254,130 B1 | 7/2001 | Jayaraman et al. | 280/743.2 |
| 6,260,879 B1 | 7/2001 | Stanley | 280/735 |
| 6,270,115 B1 | 8/2001 | Andreen et al. | |
| 6,315,323 B1 | 11/2001 | Pack, Jr. | 280/743.2 |
| 6,371,517 B1 | 4/2002 | Webber et al. | |
| 6,390,501 B1 | 5/2002 | Greib et al. | |
| 6,422,597 B1 | 7/2002 | Pinsenschaum et al. | 280/735 |
| 6,425,603 B1 | 7/2002 | Eschbach | 280/743 |
| 6,431,596 B1 | 8/2002 | Ryan et al. | |
| 6,439,603 B2 | 8/2002 | Damman et al. | |
| 6,499,765 B2 | 12/2002 | Hawthorn et al. | |
| 6,502,860 B1 | 1/2003 | Siegfried et al. | 280/801.1 |
| 6,520,540 B1 | 2/2003 | Siegfried et al. | 280/801.1 |
| 6,554,318 B2 | 4/2003 | Kohut et al. | 280/801.1 |
| 6,561,545 B2 | 5/2003 | Greib et al. | |
| 6,592,146 B2 | 7/2003 | Pinsenschaum et al. | |
| 6,692,022 B2 * | 2/2004 | Schenck et al. | 280/739 |
| 6,736,426 B2 | 5/2004 | Winters et al. | 280/743.2 |
| 2001/0035637 A1 | 11/2001 | Thomas et al. | 280/736 |
| 2002/0056975 A1 | 5/2002 | Yoon et al. | 280/735 |

* cited by examiner

SYSTEM AND METHOD FOR CONTROLLING AN INFLATABLE CUSHION

CROSS REFERENCE TO RELATED APPLICATIONS

This application is a continuation-in-part application of commonly owned and assigned U.S. patent application Ser. No. 09/951,809 filed on Sep. 13, 2001, now U.S. Pat. No. 6,736,426, which is a continuation-in-part application of commonly owned and assigned U.S. patent application Ser. No. 09/672,474 filed on Sep. 28, 2000, which issued on Jul. 23, 2002 as U.S. Pat. No. 6,422,597, the contents of which are incorporated herein by reference thereto. This application is also related to and claims the benefit of commonly owned and assigned Provisional U.S. Patent Application Ser. No. 60/343,844 filed on Dec. 27, 2001, and Provisional U.S. Patent Application Ser. No. 60/371,545 filed on Apr. 10, 2002, the contents of which are incorporated herein by reference thereto.

TECHNICAL FIELD

This disclosure relates generally to air bags for vehicles. Specifically, this disclosure relates to systems and methods for controlling the inflation level of an inflatable cushion of an air bag module.

BACKGROUND

Air bag modules have become common in modern automobiles. An air bag module typically comprises an inflatable cushion and an inflator within a housing. The module is installed in a desired position within the vehicle, such as the steering wheel, the dashboard, the seat, the A-pillar, and other locations. The inflatable cushion is stored in a folded position within the housing in fluid communication with the inflator. In response to an activation event or occurrence, a sensor provides a signal for activating the inflator. The inflator provides a supply of inflating gas to the cushion to inflate the cushion, deploying it from the housing into the vehicle.

Various methods have been employed to more closely tie the inflation level of the inflatable cushion to specific conditions. For example, dual stage inflators have been used to increase or decrease the level of inflation of the inflatable cushion. Alternatively, variable venting schemes have been used to direct a portion of a generated inflation gas away from the cushion. Further, variable tethering systems have been used to restrict or vary the overall cushion volume.

SUMMARY

An air bag pressure control system for use in a vehicle is provided. The system comprises a housing, an inflatable cushion, and a dual stage inflator. The housing is configured for installment in the vehicle in a selected spatial relation to a seating structure. The inflatable cushion is stored in an un-deployed position in the housing. The dual stage inflator is stored in the housing in fluid communication with the inflatable cushion. The inflator generates a quantity of inflation gas being in a range defined by a first quantity of inflation gas and a second quantity of inflation gas to deploy the inflatable cushion from the housing towards the seating structure. A vent opening is formed in the housing to selectively direct a portion of the first or second quantity of inflation gas towards or away from the inflatable cushion. A sensing and diagnostic module detects an activation event level. A control algorithm tailors an inflation level of the inflatable cushion during deployment by controlling the dual stage inflator to generate either the first quantity of inflation gas or the second quantity of inflation gas, by controlling the vent opening to direct the portion towards or away from the inflatable cushion, and combinations thereof.

A method of customizing the pressure within an inflatable cushion installed in a vehicle is provided. The method comprises determining at a first decision node whether or not to move an actuation mechanism from a first position to a second position based on whether a seating structure is in a first location, the actuation mechanism being configured to selectively direct a portion of an inflation gas away from or toward the inflatable cushion and being configured to selectively retain the inflatable cushion in a profile being in a range defined by a first expanded profile and a second expanded profile; determining whether a seat belt structure is in a first state or a second state; determining whether an activation event has a first level or a second level; and determining at a second detection node whether to generate the inflation gas in a high quantity, a low quantity, or no quantity based on whether the seating structure is in the first location, whether the seat belt structure is in the first or second state, and whether the activation event has the first or second level.

Another method of customizing the pressure within an inflatable cushion installed in a vehicle is also provided. The method comprises detecting an activation event level, the activation event level being in a range defined by a first level and a second level; detecting a seating structure position, the seating structure position being in a range defined by a first position and a second position; detecting a seat belt state, the seat belt state being in a range defined by a first state and a second state; and controlling a generation of a quantity of inflation gas, a diffusion of a portion of the inflation gas, and a change in an expanded state of an inflatable cushion based on the activation event level, the seating structure position, and the seat belt state.

A third method of customizing the pressure within an inflatable cushion installed in a vehicle is provided. The method comprises determining at a first decision node whether a seating structure is in a first location or a second location; determining at a second decision node whether a seat belt structure is in a first state or a second state; determining at a third decision node whether an activation event has a first level or a second level; and generating an inflation gas unless the seating structure is in the first location, the seat belt structure is in the first state, and the activation event has the first level; diffusing a portion of the inflation gas away from an inflatable cushion and retaining the inflatable cushion in a first expanded profile if the seating structure is in the first location and the inflation gas is generated; and diffusing the portion of the inflation gas toward the inflatable cushion and changing the inflatable cushion to a second expanded profile if the seating structure is in the second location and the inflation gas is generated.

The above-described and other features of the present disclosure will be appreciated and understood by those skilled in the art from the following detailed description, drawings, and appended claims.

DRAWINGS

DESCRIPTION OF THE PREFERRED EMBODIMENT

Figure 1:
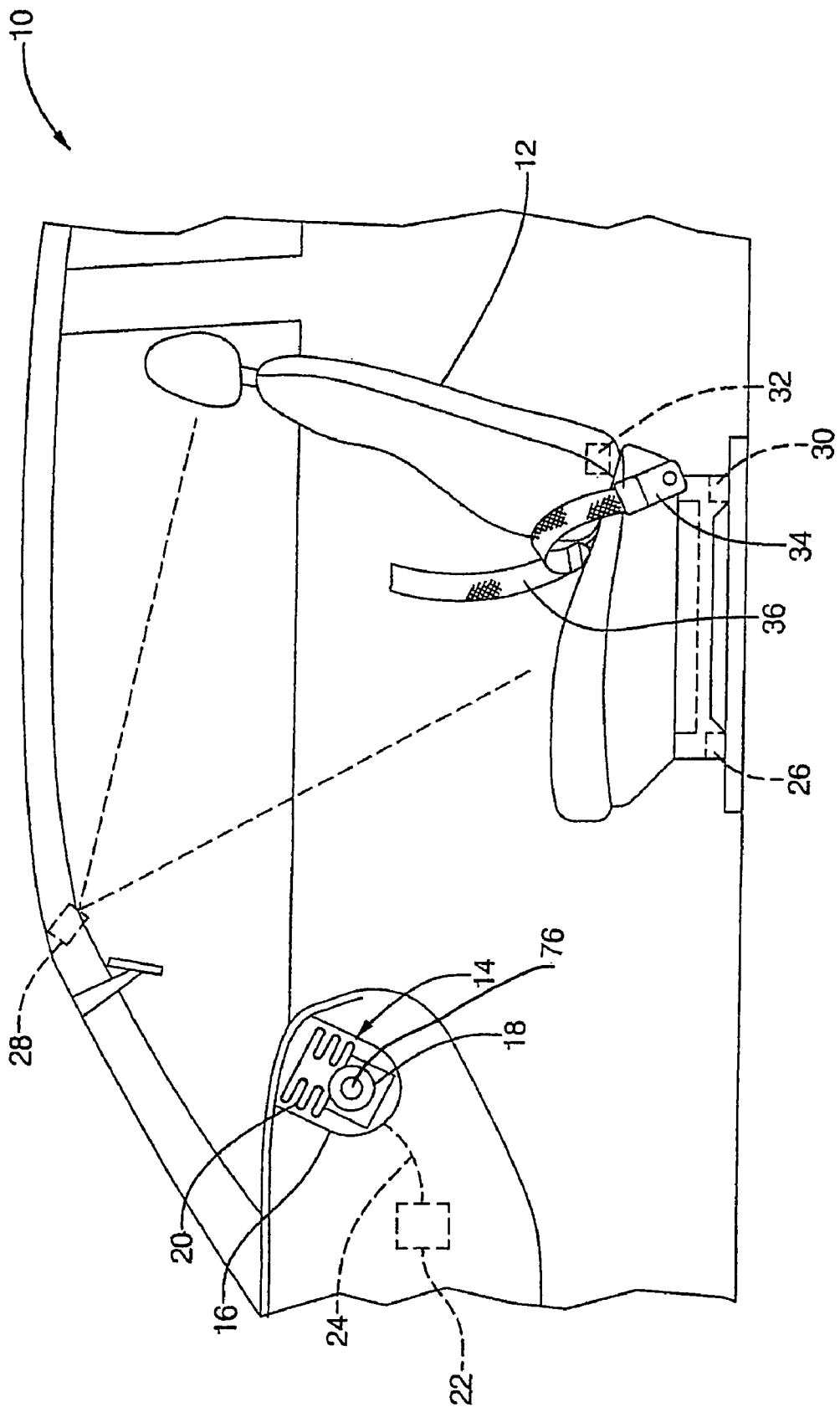
FIG. 1 is a schematic view of a vehicle interior showing an air bag cushion in a stored or undeployed state.

Referring now to the Figures, and in particular to FIG. 1 a portion of a vehicle 10 is illustrated. Included in an interior compartment of vehicle 10 are a seating structure 12 and an air bag module 14 disposed in a selected spatial relationship with respect to seating structure 12. The air bag module 14 comprises a housing 16, an inflator 18, and an inflatable air bag or cushion 20. The module 14 is positioned in the vehicle 10 for deployment of the cushion 20 towards the seating structure 12.

A sensor or sensing-and-diagnostic module 22 is adapted to detect an activation event to provide an activation signal 24 to the inflator 18. The detection of the activation event can be determined by one or more sensors disposed about the vehicle. Thus, the activation signal 24 controls the activation of the airbag module 14.

The cushion 20 is stored in a folded or undeployed position in the housing 16, and is in fluid communication with the inflator 18. Upon detection of an activation event by the sensing-and-diagnostic module 22, the inflator 18 is activated via signal 24 to generate an inflation gas. The inflation gas causes the cushion 20 to inflate and expand from the housing 16 into the interior of the vehicle 10. It should be recognized that the module 14 is illustrated by way of example only as being included in the dashboard of the vehicle 10. Of course, it is contemplated for module 14 to be installed in other regions of the vehicle 10, such as, but not limited to the steering wheel, the seat, the A-pillar, the roof, and other locations.

The sensing-and-diagnostic module 22 can also be adapted to detect one or more conditions of the seating structure. For example, sensing-and-diagnostic module 22 can be adapted to detect one or more of the following: a load on the seating structure 12, a position of the seating structure, an angle of a portion of the seating structure with respect to another portion, the distance the seating structure is from the air bag module 14, and other data that is relevant to the deployment of the airbag. For example, the sensing-and-diagnostic module 22 can receive input from one or more sensors such as, but not limited to, a seat position sensor 26, an optical scanner 28, a load sensor 30, a seat recline sensor 32, a seat belt use detection sensor 34, and a belt tensioning sensor (not shown). The sensors are positioned to provide input signals to module 22 indicative of one or more seat conditions.

The seat position sensor 26 detects the position or distance of seating structure 12 with respect to the air bag module 14. Similarly, the optical scanner 28 can be used to detect the position of seating structure 12. The load sensor 30 is disposed within the seating structure 12 and can be used detect the load on the seating structure. Thus, sensor 30 is capable of detecting the specific weight or load on a portion of seating structure 12. The seat recline sensor 32 can be used to detect the degree or angle to which an upper or back portion of the seating structure 12 is reclined or positioned with respect to a lower or seat portion of seating structure 12. The seat belt use detection sensor 34 can determine whether the seat belt 36 is secured (e.g., buckled is inserted into its corresponding clasp). The seat belt tensioning sensor, alone or in combination with the load sensor 30, can also be used determine the load on the seating structure 12.

Figure 2:
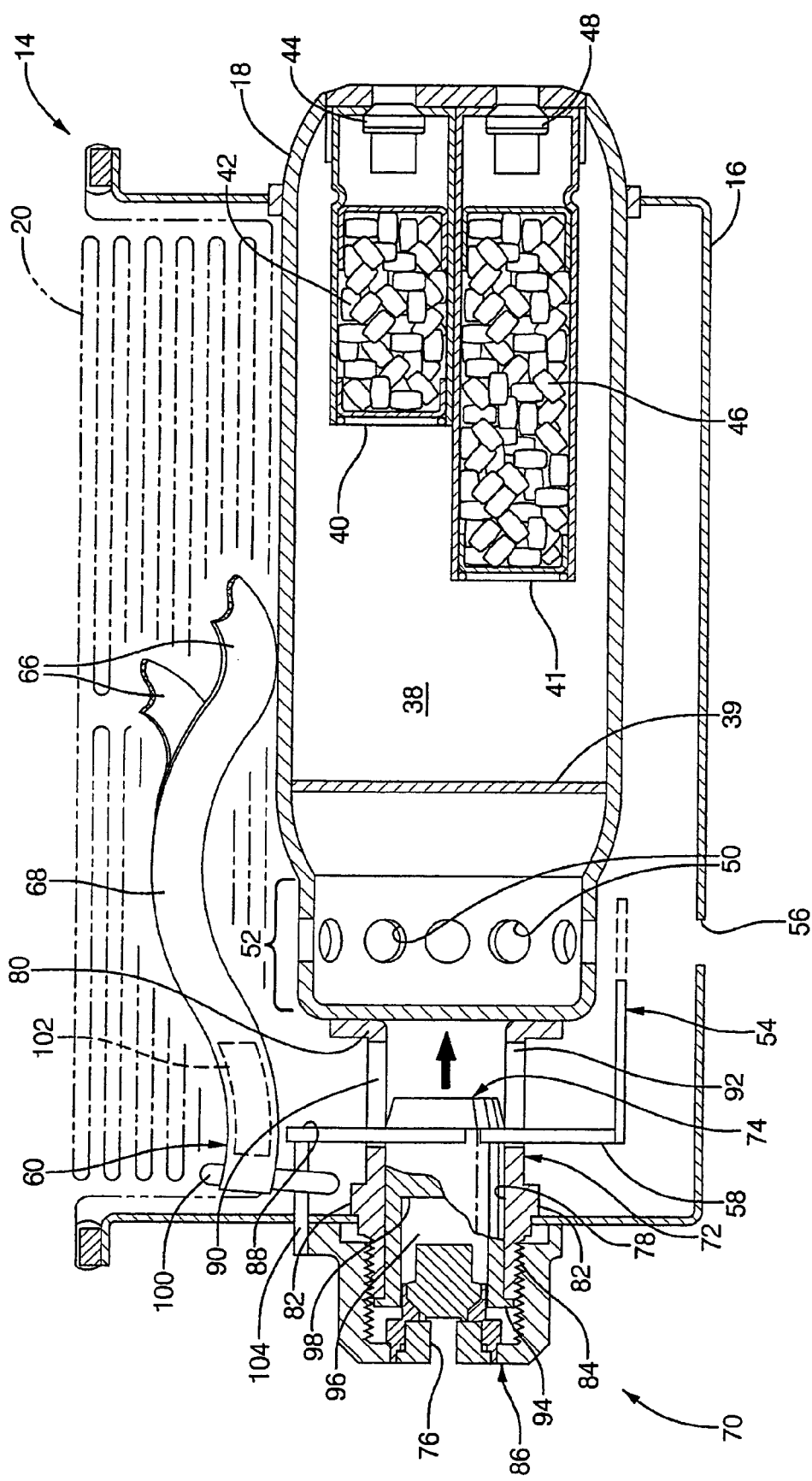
FIG. 2 is a sectional view of an exemplary embodiment of an air bag module.
Figure 3:
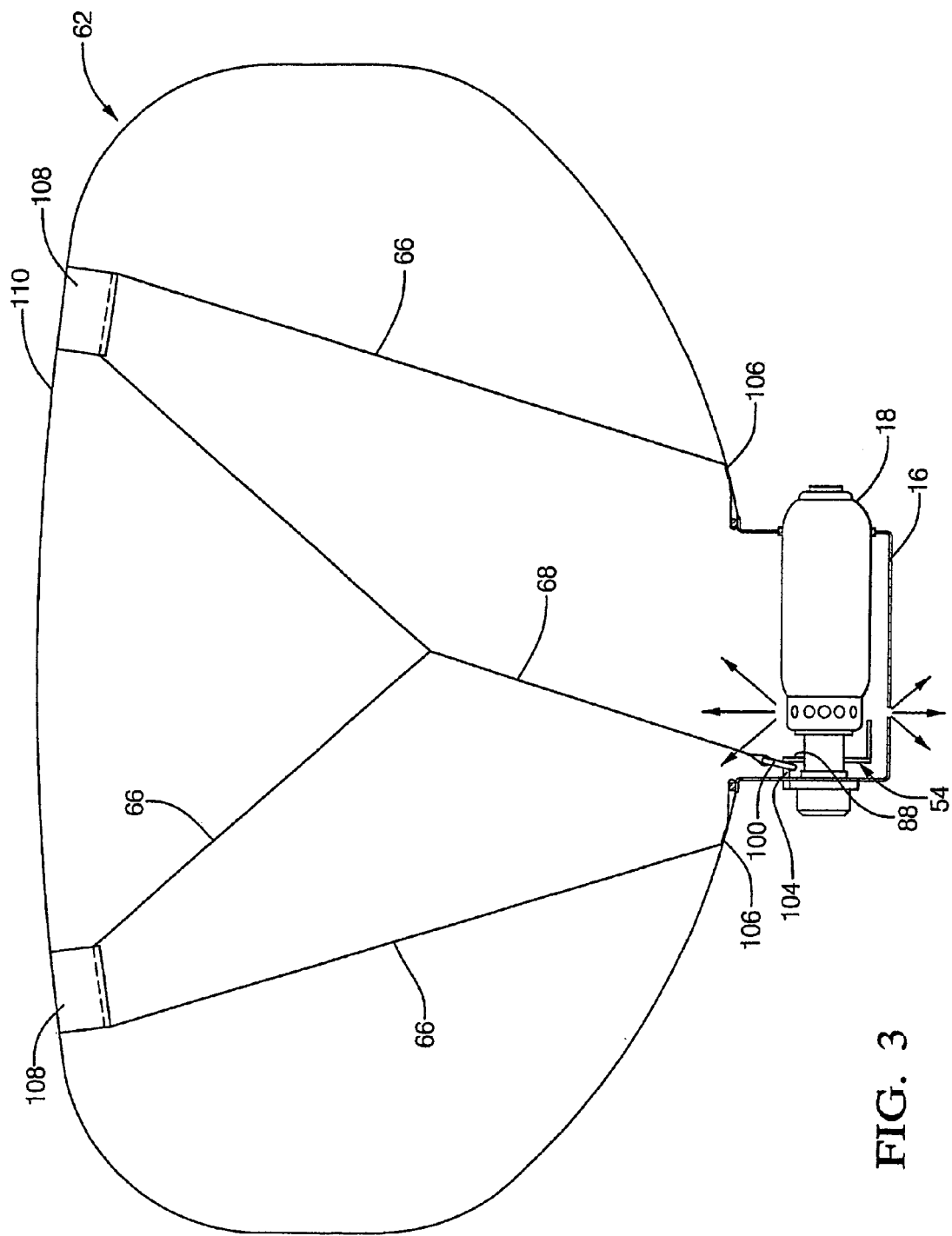
FIG. 3 illustrates an exemplary embodiment of an inflatable cushion in a first deployed state.
Figure 4:
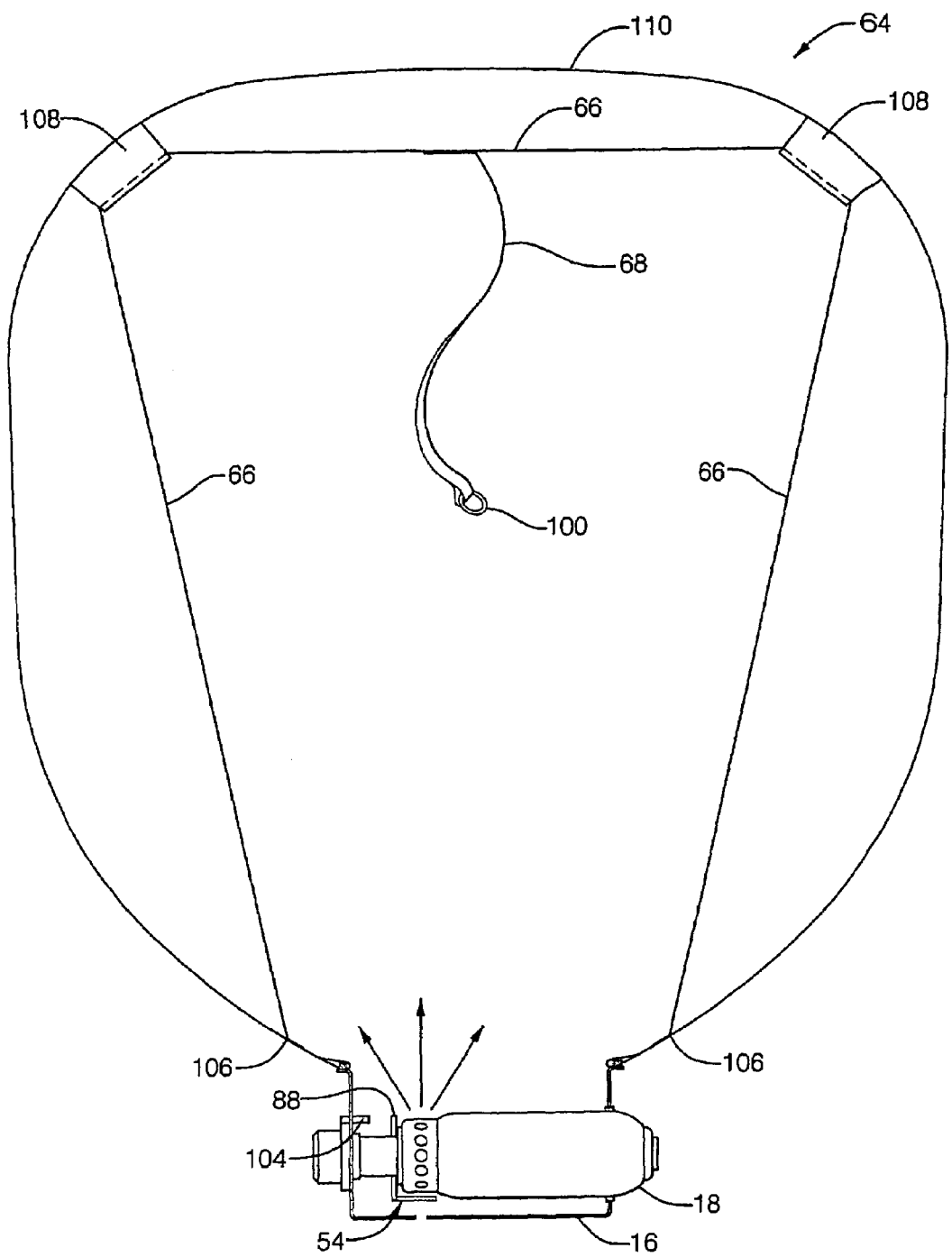
FIG. 4 illustrates the inflatable cushion of FIG. 3 in a second deployed state.

An exemplary embodiment of an air bag module for use with the present disclosure is illustrated in FIGS. 2–4. As will be described in detail below, air bag module 14 comprises means to customize or tailor the inflation level within the inflatable cushion 20. The inflation level is controlled by the control module 22 to be commensurate with specific data inputs received from the plurality of sensors. Specifically, the air bag module 14 is configured to adjust the quantity of inflator gas generated from the inflator 18, to adjust the quantity of inflator gas directed into the inflatable cushion 20, to adjust the volume of the cushion, and combinations of one or more of the foregoing. Here, the various means are integrally controlled to provide a simple, inexpensive, and reliable way to adapt the inflation level of cushion 20 to various conditions.

It has been determined that the pressure within the inflatable cushion upon deployment is proportional to the quantity of inflator gas expelled into the air bag and inversely proportional to the volume available to be occupied by the inflator gas within the air bag. Accordingly, the various means in the module 14 are controlled to take advantage of this principle to provide a simple, inexpensive, and reliable way to adapt the inflation level of cushion 20 in accordance with various conditions.

Turning now to FIG. 2, the air bag module includes among other elements the housing, the inflator, and the inflatable air bag or cushion. The inflator is a dual stage inflator, adapted to release at least two levels of inflator gas into the cushion 20. The dual stage inflator 18 can be, for example, inflators such as, but not limited to pure gas inflators, hybrid inflators, pyrotechnic inflators, and the like.

By way of example only, dual stage inflator 18 is described herein as a hybrid inflator. Hybrid inflators include both a pressure vessel having a stored gas and one or more gas generators. When the gas generator is ignited, it generates additional gas and/or adds heat to the stored gas of the pressure vessel to provide the desired quantity of inflation gas.

Inflator 18 comprises a quantity of stored gas in a first area 38 sealed by a rupturable diaphragm 39. The first area 38 includes a first gas generator 40 and a second gas generator 41. The first generator 40 comprises a first amount of propellant 42 and a first squib or initiator 44 for igniting the same. The second gas generator 41 houses a second amount of propellant 46 and a second squib or initiator 48 for igniting the same. By way of example only, the first and second propellants can be sodium azide. Thus, the first squib 44 provides a means for igniting propellant 42 and the second squib 48 provides a means for igniting propellant 46.

The squibs (44 and 48) are activated by a signal generated by the sensing-and-diagnostic module 22. The ignition of either or both of the gas generators 40 and 41 generate an additional amount of gas and/or generate heat, which causes the gas stored in the first area 38 to increase in pressure and thus, to rupture the diaphragm 39.

Once the diaphragm 39 is ruptured, the first area 38 is in fluid communication with gas discharge ports 50. Gas discharge ports 50 generally surround a diffuser portion 52 of inflator 18 such that gas generated by the inflator is communicated to the inflatable cushion 20.

The first generator 40 is smaller (e.g., capable of generating less inflation gas and/or heat) than the second generator 41. Accordingly, the quantity of gas generated and expelled by the inflator 18 upon the ignition of the first generator 40 is smaller then the quantity of gas generated and expelled by the inflator upon the ignition of the second generator 41.

Additionally, both gas generators 40 and 41 can be ignited simultaneously or delayed from one another to allow inflator 18 to provide two or more levels of inflation. For example, firing both generators will provide a higher level of inflation than firing one or the other. In addition, by delaying the firing of one generator after the other can also cause the level of inflation to be varied. In this manner, the dual stage inflator can be configured to provide two or more levels of inflation.

Again, it should be recognized that inflator 18 is described herein by way of example only as a hybrid inflator. Of course, other inflators having means of providing more than one level of inflation are contemplated for use with the module of the present disclosure.

In an exemplary embodiment, the dual stage inflator is adapted to provide about 80% level of inflation (e.g., ignition of only the second generator 41) and to provide a 100% level of inflation (e.g., simultaneous ignition of both the first and second generators).

The initiator sequencing of dual stage inflator 18 is also described above by way of example only. Of course, other initiator sequencing configurations adapted to various levels of inflation are also contemplated to be within the scope of the present disclosure. Also contemplated are dual stage inflators 18 configured to provide more or less than the 80% level of inflation. Further, the dual stage inflator 18 is described above by way of example only as providing two levels of inflation (80% and 100%). Of course, the time period between ignition of the generators 40 and 41 can be varied as to provide a range of output quantities.

Additionally, the dual stage inflator 18 is described above by way of example as igniting only the second generator 41 to provide the 80% level of inflation, and igniting the propellants of both the first and second generators 40 and 41 to provide the 100% level of inflation. Of course, it is contemplated for the dual stage inflator 18 to include a disposal ignition of the first generator 40 under any deployment conditions. For example, it is often desired that all of the pyrotechnic or potential energy be used during the deployment of the air bag cushion. Under low inflation conditions, the dual stage inflator 18 is configured to ignite the first generator 40 about 50–100 ms (milliseconds) after the ignition of the second generator 41 in order to dispose the module of stored energy. By igniting the first generator after the aforementioned delay period, the ignition of the first generator will not vary the overall or intended inflation level. Thus, the disposal ignition of the propellant of first generator does not affect the ability of the dual stage inflator 18 to provide the 80% inflation level.

As also illustrated in FIG. 2, the air bag module 14 further comprises a variable inflator means. For example, a vent system 54 is adapted to direct different levels of the generated inflator gas to the cushion. The housing 16 includes a vent opening or aperture 56, while the airbag module 14 includes a vent-blocking-device 58 that is moveable between an open position and a closed position (illustrated in phantom). When the vent-blocking-device 58 is in the closed position, it covers opening 56 such that all of the inflator gas generated by inflator 18 is directed toward the opening of cushion 20 to provide a high level of inflation. When the vent-blocking-device 58 is in the open position (e.g., aperture 56 unblocked) at least a portion of the inflator gas generated by inflator 18 is allowed to flow through opening 56 and away from the cushion to provide a low level of inflation. Other vent devices contemplated for use with the present disclosure are illustrated in U.S. Pat. Nos. 6,039,346, 6,161,866, 6,213,502 and 6,247,726, the contents of which are incorporated herein by reference thereto.

In an exemplary embodiment, the variable inflator vent system 54 is configured to provide about a 70% level of inflation when vent openings 56 are unblocked, and about a 100% level of inflation when the vent openings 56 are covered by device 58.

Of course, it should be recognized that the variable inflator vent system 54 is described above by way of example only. Also contemplated for use with the present disclosure are variable inflator vent systems 54 configured to provide other diffusion ratios, and/or more than two diffusion ratios for the cushion 20. For example, the movement of the vent-blocking-device 58 between the open and closed positions can be timed with respect to the generation of the inflator gas by inflator 18 to provide a range of output quantities between the various levels.

In a first embodiment, the air bag module 14 comprises the dual stage inflator 18 and the variable inflator vent system 54. In this configuration, the module can be controlled to provide three discrete inflation input levels.

Air bag module 14 can also comprise a variable tether system 60. The variable tether system 60 is illustrated in detail in FIGS. 3–4. Variable tether system 60 is adapted to provide cushion 20 with either a first expanded state/profile 62 (FIG. 3) or second expanded state/profile 64 (FIG. 4). Thus, the variable tether system is configured to adjust the volume and rearward excursion (e.g., movement towards the seating structure 12) of the cushion.

Specifically, the variable tether system comprises one or more tethering elements 66 connected to an inner surface of the cushion at either end, and a releasable element 68 connected to the tethering elements 66 between the end points of the tethering elements. Releasable element 68 releasably secures a portion of the tethering elements to the air bag module. When the releasable element secures the tethering elements to the air bag module, the tethering element is restricted from fully expanding, and thus the cushion is maintained at the first expanded state 62. Thus, the first expanded state is provided by retaining releasable element 68 to the air bag module 14 (FIG. 3). In order to provide the second expanded state, the releasable element is released from the air bag module 14 thereby allowing the tethering elements 66 to extend to their full length (FIG. 4). In this manner, variable tether system 60 is configured to provide the air bag module 14 with an adjustable volume for the cushion 20 (e.g., a larger volume in FIG. 4 and a smaller volume in FIG. 3).

In an exemplary embodiment, the variable inflator vent system 54 is linked to the variable tether system 60. Specifically and with reference to FIG. 2, an actuation mechanism 70 is adapted to operate both the variable inflator vent system 54 and the variable tether system 60. The actuation mechanism 70 comprises a support structure 72, a plunger element 74, and an initiating device 76. The support structure 72 defines an axial opening 78 into which the plunger element and the initiating device are inserted during assembly.

The support structure 72 includes a first support end 80 of a substantially flanged configuration that is secured directly to the inflator 18. First support end 80 of the support structure is secured to the inflator 18 by any suitable method, such as welding or equivalents thereof. In the embodiment of FIG. 2, support structure 72 also includes a spacing shoulder 82 which is sized larger than an end opening in the housing such that the support structure is limited from going through the end opening within the housing and is properly positioned during assembly. Spacing shoulder 82 is preferably integrally formed with support structure 72 by machining or molding the same together. Alternatively, the spacing shoulder may also be provided as a separate piece attached to or slipped over the support structure. The support structure further includes a threaded end portion 84. Threaded end portion 84 extends past the spacing shoulder 82 through the end opening of the housing for mating with a cap nut 86 in order to secure the dual stage inflator and the actuation device 70 to the housing.

The plunger element is seated within the axial opening of the support structure and has an outside diameter that is slightly smaller than the axial opening such that the plunger element may slide relative to the support structure. The plunger element 74 comprises a tether-blocking-device 88 and vent-blocking-device 58. The blocking devices 88 and 58 are slidably disposed in guide channels 90 and 92, respectively. Thus, movement of plunger element 74 within support structure 72 causes the blocking devices (88 and 58) to slide within the guide channels (90 and 92).

Plunger element 74 can include a shear feature 94, which is illustrated as a flange located at the end of the plunger element 74. The shear feature is preferably integrally formed with the plunger element 74. Alternatively, shear feature 94 is a separate piece attached to the plunger element 74. The shear feature is sized to be larger than the axial opening within the support structure such that the shear feature engages the support structure during insertion of the same thereby limiting the insertion of the plunger element into the support structure. Thus, with the shear feature intact the plunger element is prevented from sliding within the support structure.

Plunger element 74 includes an axial plunger bore 96 in which initiating device 76 is sealed. Initiating device 76 is a pyrotechnic squib, pneumatic actuator or equivalent thereof. Initiating device 76 is shown schematically in FIG. 1. The initiating device is configured for activation by an activation signal from sensing-and-diagnostic module 22. Upon activation, initiating device 76 is configured to provide a means for urging the plunger element away from the initiating device. Plunger element 74 is urged with a force sufficient to cause shear feature 94 to break off. Thus, plunger element 74 continues to slide within the support structure until the plunger abuts a portion of inflator 18, which acts as a stop surface.

When the initiating device 76 is a pyrotechnic squib, the initiating device produces a pressure wave that reacts with a plunger reaction surface 98. The application of such force causes shear feature 94 to break off and permits the plunger element 74 to slide within the support structure 72.

The movement of the plunger element within the support structure causes both the tether-blocking-device 88 and the vent-blocking-device 58 to slide within guide channels 90 and 92, respectively. The movement of the tether-blocking-device 88 and the vent-blocking-device 58 are described in more detail below.

The movement of the plunger element within the support structure causes the tether-blocking device to slide within guide channel 90 such that the tether-blocking device releases the releasable element 68. Specifically, releasable element 68 includes a securing member 100. The securing member 100 can, for example, be secured to the releasable element 68 by stitching 102 or can be a part of the releasable element defined by the stitching.

The securing member 100 is preferably formed from materials having the ability to withstand substantial loading such as, but not limited to, nylon cords, metal rings, and equivalents thereof. The securing member is passed over a retaining stud 104 that is fixedly secured to the housing or other location wherein the location of the stud is not affected by the movement of the plunger element and other movable mechanisms of the air bag module. Thus, retaining stud 104 extends through the opening in the securing member such that the securing member may be released and pulled away from the retaining stud when tension is applied to the releasable element 68. For example, retaining stud 104 can have an angular configuration for the securing member to slide off. Alternatively, retaining stud 104 is made out of a material that is bendable by the tension of releasable element 68 once tether-blocking-device 88 is moved away from retaining stud 104. However when the plunger element is not moved from retaining stud 104, it is disposed in butting or notched relation to the tether-blocking-device 88. As will be appreciated, the tether-blocking-device 88 when held in position by shear feature 94 prevents withdrawal of securing member 100 from retaining stud 104. Thus, no movement of the plunger element causes the securing member to be retained on retaining stud 104. Upon the movement of plunger element 74 by initiating device 76, the tether-blocking-device 88 moves away from the retaining stud 104 thereby allowing the securing member to be pulled away from the retaining stud as the cushion inflates.

The operation of the tether-blocking-device 88 is best illustrated with reference to FIGS. 2–4. The tether-blocking-device 88 is shown in a first position (FIGS. 2–3) abutting the retaining stud 104 thereby securing the securing member to the housing and retaining the cushion in the first expanded state 62. Alternately, the tether-blocking-device 88 is illustrated in FIG. 4 away from the retaining stud 104 thereby allowing the securing member 100 to be pulled away from the retaining stud by the inflation of cushion 20.

As illustrated through simultaneous reference to FIGS. 3 and 4, the air bag cushion 20 is capable of being maintained at the first expanded profile (FIG. 3) or being extended to the second expanded profile (FIG. 4). The second expanded profile is characterized by more inflating volume corresponding to more depth and rearward excursion of the air bag. In an exemplary embodiment, the variable tether system is configured to provide about an 87% total volume of an unrestrained cushion 20 in the first expanded state 62. The variable tether system also is configured to provide about a 100% volume of the cushion 20 when the tether-blocking-device 88 is moved away from the retaining stud 104 thereby releasing the securing member 100. Of course, a variable tether system 60 configured to provide other volumes is contemplated in accordance with the present disclosure.

Tethering elements 66 are preferably in the form of straps that limit volume and profile of cushion 20. The tethering elements 66 are preferably disposed across an interior length of the air bag cushion and extend in a travel path between fixed points of connection 106 located along the surface of the air bag cushion. As shown in FIGS. 3 and 4, the tethering elements 66 are preferably further connected to the surface of the air bag cushion 20 at locations along the travel path by guide elements 108. Guide elements 108 are located at a surface 110 that is distal from inflator 18. The operative length of the tethering elements 66 can be varied by, for example, varying the length of releasable element 68, the length of the securing member 100, changing the location of points 106, and/or changing the size or location of the guide elements 108. Releasable element 68 is connected to the tethering elements at a location intermediate to the fixed points of connection 106.

When the releasable element 68 is retained at the retaining stud 104, the tethering elements 66 will cause the depth of the air bag cushion 20 to be restrained to the first expanded profile 62 (e.g., 87% of the second expanded profile 64). However, when the releasable element 68 is released from the retaining stud 104, the tethering elements 66 will cause the depth of the air bag cushion 20 to be expanded to the second expanded profile 64. The second expanded profile 64 is about 13% larger than the first expanded profile 62.

In an exemplary embodiment, the tethering element remains connected to at least two points of attachment 106. Of course, tethering elements 66 are capable of being secured to more than two points to accordingly vary the volume of the air bag cushion. Such points of attachment 106 provide for continued restraint of the air bag cushion. This is caused by the tethering element 66 even after the operative length is allowed to fully expand. Namely, the tethering element 66 continues to contour the profile of the air bag cushion 20 even with an enhanced operating length provided by the second state. The material forming the tethering element 66 and the releasable element 68 is preferably of pliable nature such as a woven or knitted textile having a construction resistant to substantial elongation upon the application of tensile forces. A woven structure of NYLON yarns is an example of such a material.

The movement of the plunger element within the support structure also causes the vent-blocking device 58 to slide within guide channel 92 such that the vent-blocking device closes or blocks vent openings 56. In the illustrated embodiment, tether-blocking-device 88, and vent-blocking-device 58 are arranged in a substantially "L" shaped cross sectional profile when a portion of the tether-blocking-device 88 does not abut retaining stud 104. Further, the tether-blocking-device 88, vent-blocking-device 58, and retaining stud 104 are arranged in a substantially "Z" shaped cross sectional profile when a portion of the tether-blocking-device 88 does abut retaining stud 104. Of course, other profiles and configurations of retaining stud 104 and tether-blocking-device 88 and vent-blocking-device 58 are contemplated in accordance with the present disclosure.

As illustrated, such vent openings 56 are normally in fluid communication with gas discharge ports 50 generally surrounding the diffuser portion 52 of the inflator. The vent-blocking-device is moveable within the second guide channel 92 in order to close or block the inflator vent openings upon activation of initiating device 76 which causes vent blocking device 58 to slide in the guide channel.

The operation of the vent-blocking-device 58 is illustrated with reference to FIG. 2. Here, vent-blocking-device 58 is shown in an open or first position in solid lines with vent openings 56 uncovered to direct a portion of the generated gas away from air bag cushion 20. Alternatively, the vent-blocking-device 58 is shown in a closed or second position in phantom lines with the vent-blocking-device blocking vent openings 56 thereby directing a larger portion of the generated inflator gas to inflate the air bag cushion.

In the illustrated exemplary embodiment, prior to activation of inflator 18 the air bag cushion 20 is stored in the housing in a folded condition. In addition, prior to activation of the inflator 18, the tether-blocking-device 88 as well as the vent-blocking-device 58 are held in a first position by shear feature 94 such that retaining stud 104 and tether-blocking-device 88 hold releasable element 68 in place. The vent-blocking-device 58 is in a non-blocking position (e.g., normally open) thereby permitting egress of inflator gas outwardly from the housing. As an alternative, the tether system and the venting system are individually activated by a control system wherein activation of one does not necessarily mean activation of the other. Further, it is contemplated for the vent-blocking-device 58 to be in a blocking position (e.g., normally closed) thereby preventing egress of inflator gas outwardly from the housing.

Figure 5:
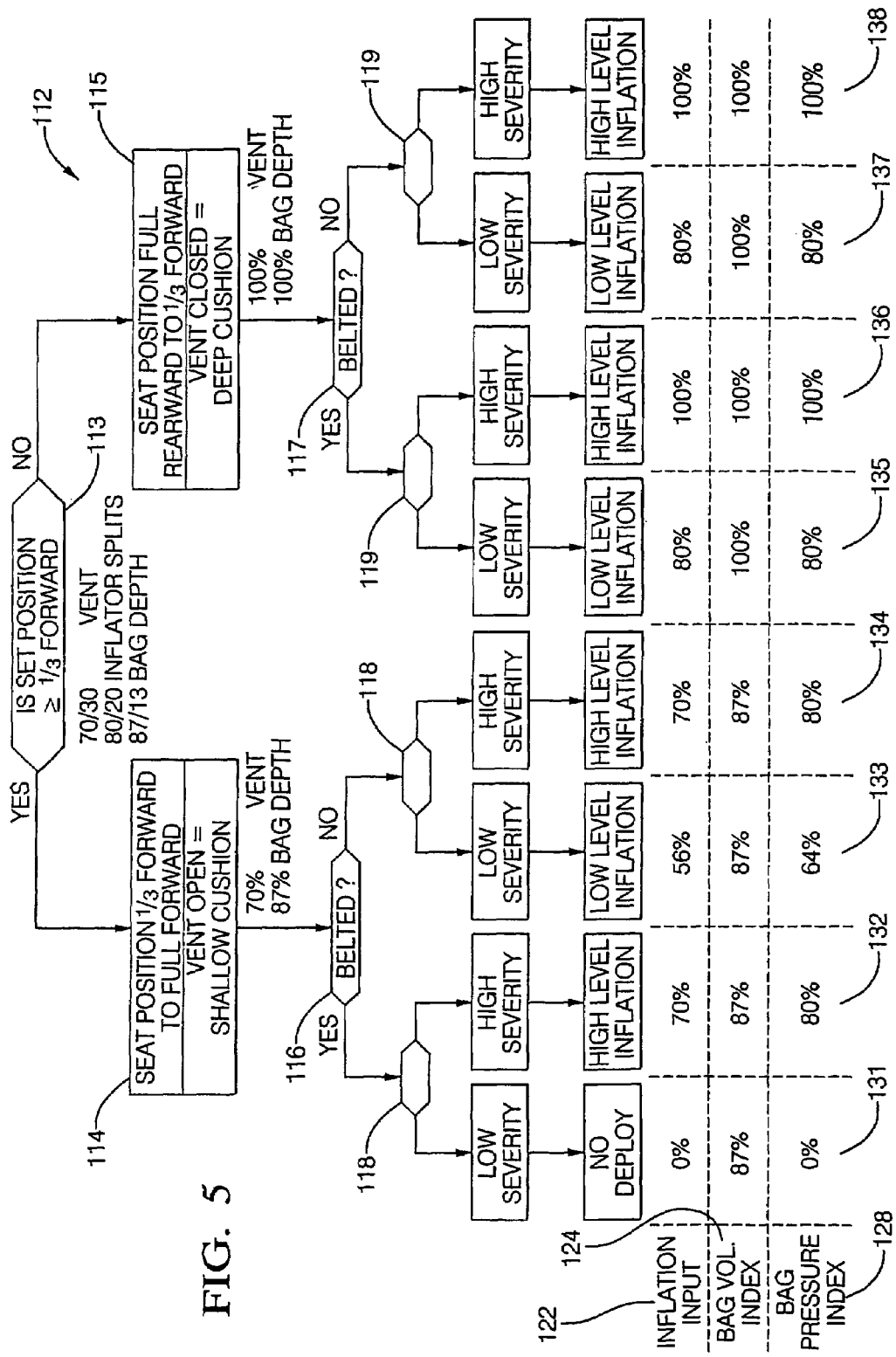
FIG. 5 is an exemplary embodiment of a control algorithm for the control of the air bag module of FIGS. 2–4.
Figure 6:
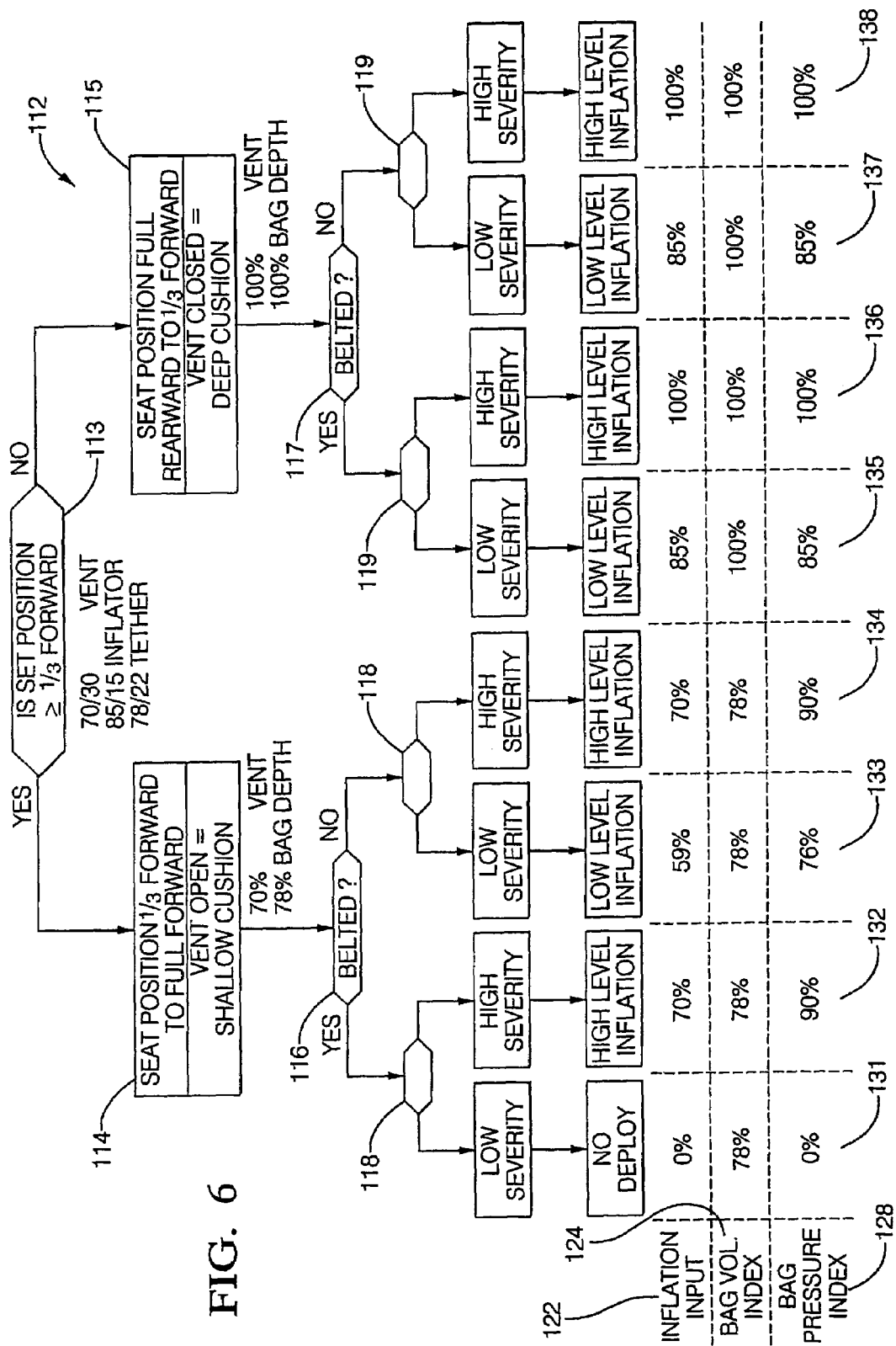
FIG. 6 is an alternative exemplary embodiment of the control algorithm of FIG. 5.
Figure 7:
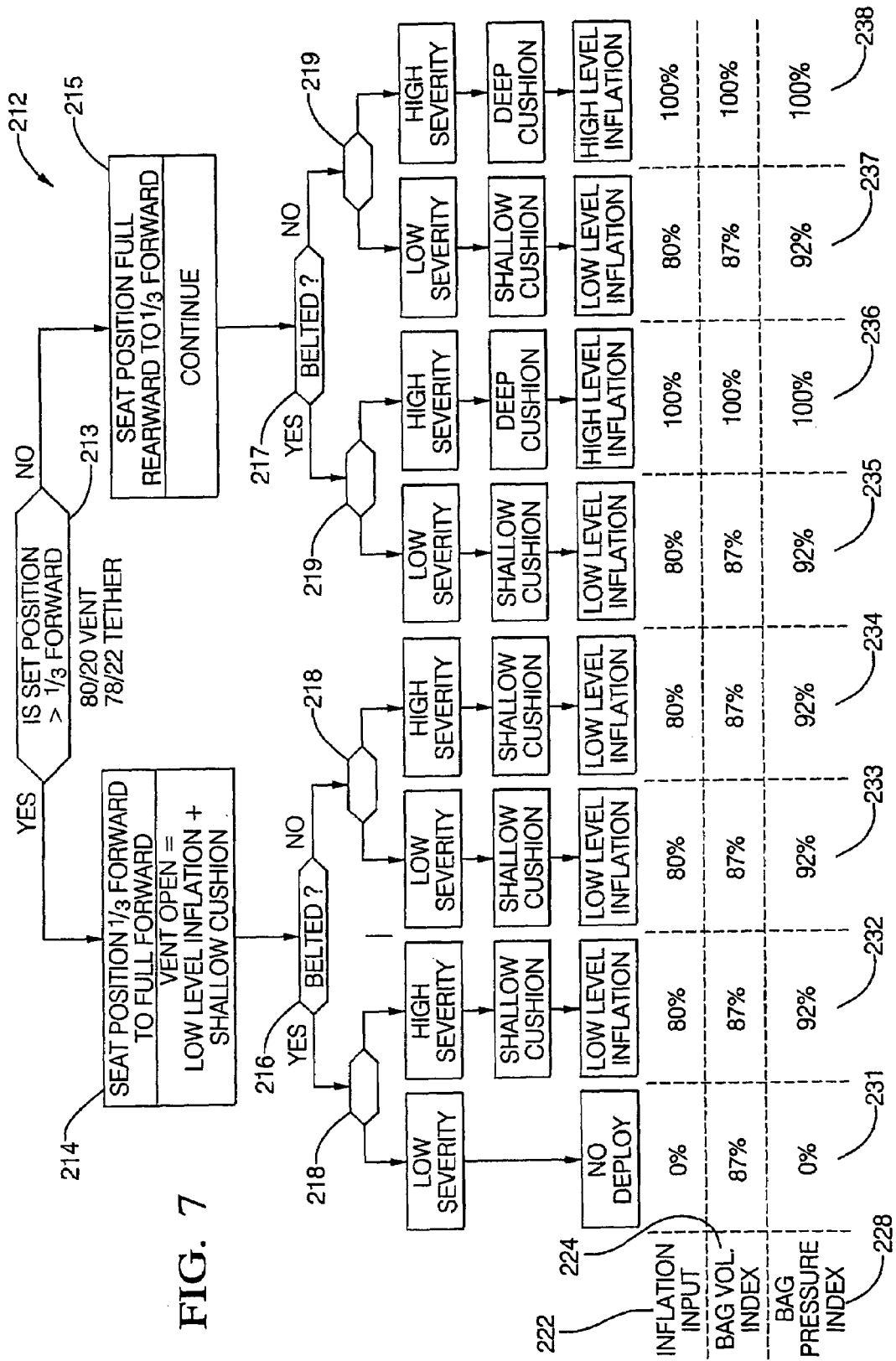
FIG. 7 is an alternative exemplary embodiment of a control algorithm for the control of the air bag module of FIGS. 2–4.

Thus, the module 14 comprising the dual stage inflator 18, the variable inflator vent system 54 and the variable tether system 60 provides three means to customize or tailor the inflation level within the inflatable cushion 20. The control strategy of these three means can be adapted to the particular vehicle, the activation event, the environmental conditions, conditions of the seating structure 12, and the like. Exemplary embodiments of control algorithms for controlling the air bag module are illustrated in FIGS. 5–7. Of course it should be recognized that other methods of controlling the module are contemplated.

Referring now to FIG. 5, an exemplary embodiment of portions of a control algorithm 112 for controlling the air bag module is illustrated. Control algorithm 112 receives inputs from a plurality of sensors relating to the state of the vehicle and component parts of the same. In response to these inputs a control module and/or a sensing-and-diagnostic module determines whether the airbag should be deployed and what configuration the various schemes of the airbag activity devices are employed. Accordingly, and based upon input data control algorithm 112 will vary the level of inflation by controlling the initiators, the variable venting system, and the variable tether system to provide a simple, inexpensive, and reliable way to adapt the level of deployment to the conditions that are indicative of the various inputs. Once the sensing-and-diagnostic module 22 detects an activation event, the control algorithm 112 determines which of the various systems within the air bag module are to be activated/used and the configuration of the same.

Control algorithm 112 in this embodiment determines whether the integrated variable vent system 54 and the variable tether system 60 are to be activated. Specifically, decision node 113 makes its decision based on the various inputs including the position of seating structure 12. The inputs are detected and inputted into the algorithm by seat position sensor 26, optical scanner 28, seat recline sensor 32, and/or combinations thereof.

For example, if seating structure 12 is between a full forward position and a one-third forward position (e.g., if the seating structure is close to the air bag module 14), then decision node 113 does not activate the variable vent system 54 and the variable tether system 60. In this instance, the variable venting system 54 directs 70% of the generated inflation gas and the releasable element 68 retrains the cushion to the first expanded state 62. Thus, less inflation gas is provided to the cushion 20 and the cushion is retained to a lesser degree than provided by the second expanded state 64.

However, if the seating structure 12 is between a one-third forward position and a full rearward position (e.g., if the seating structure is further away from the air bag module 14), then the decision node 113 activates the variable vent system 54 and variable tether system 60 by way of ignition of the initiating device 76. In this instance, the variable venting system 54 directs 100% of the generated inflation gas to the cushion 20, and the releasable element 68 is released such that the cushion is opens to the second expanded state 64. Thus, a larger amount of inflation gas is provided to the cushion 20, and the cushion is allowed to expand farther than provided by the first expanded state 62.

Next or simultaneously, the control algorithm 112 determines whether the seat belt structures are secured (e.g., buckled is inserted into its corresponding clasp). Specifically, a decision node 116 or 117 depending on the result of node 113 determines whether the seat belts are secured. This determination is made by the inputs received from the seat belt detection sensors 34.

Then or again simultaneously, control algorithm 112 determines at a corresponding decision node 118 or 119 whether the activation event detected by the sensing-and-diagnostic module 22 requires a high level of inflation or a low level of inflation.

Control algorithm 112 provides the inputs or signals to the air bag module to provide the inflation level corresponding to the results of decision nodes 113 and 116–119. Accordingly, the control algorithm controls the activation of the air bag module 14 to provide five discrete inflation input levels (0%, 56%, 70%, 80%, and 100%) based on seat belt usage, the activation event, and position of seating structure 12.

The high inflation level, which is caused by igniting the first and second generators, corresponds to a high activation event level. During a low inflation level, only the second generator is ignited.

In the embodiment of FIG. 5, an air bag pressure index or inflation level 128 within cushion 20 is determined from the inflation input 122 and the air bag volume index 124. The inflation input 122 is proportional to the quantity of inflation gas generated by the inflator 18 multiplied by the quantity of inflation gas directed to the cushion 20 by the variable venting system. Thus, the inflation input 122 is dependant on the state of the variable venting system 54 and on the state with which the dual stage inflator 18 is operated, if at all. The air bag volume index 124 is dependant on the state of the variable tether system 60, namely the first expanded state 62 or second expanded state 64. The air bag pressure index 128 is determined by dividing the inflation input 122 by the bag volume index 124.

Accordingly, the result of the control algorithm 112 is the deployment of the air bag module 14 in such a manner to adapt or customize the air bag pressure index 128 to a desired level that is based in part on seat position, seat belt usage, and activation event level. In the example of FIG. 5, the control algorithm 112 results in eight different deployment scenarios, each having an air bag pressure index 128 commensurate in magnitude to the seat position, seat belt usage, and activation event level.

Deployment scenarios 131–138 are each described below with respect to their resultant air bag pressure indexes 128. Deployment scenarios 131–134 represent the output when the first decision node 113 does not activate the variable vent system 54 and release the variable tether system 60 (block 114). Deployment scenarios 135–138 represent the output of the when the first decision node 113 activates the variable vent system 54 and the variable tether system 60 (block 115).

Referring back now to deployment scenario 131, the same relates to the following inputs: seat belt in use, low activation event level, and seating structure 12 is between a full forward position and a one-third forward position. Here, the algorithm does not activate the inflator 18. The inflation input 122 is equal to zero because the amount to be directed to the cushion is 70% but the quantity of gas generated is zero (e.g., 70%×0%). The bag volume index 124 is 87% since the variable tether system 60 is not released. Therefore, deployment scenario 131 provides an air bag pressure index 128 equal to zero (e.g., 0%÷87%).

In deployment scenario 132, the same relates to the following inputs: seat belt in use, seating structure 12 is between a full forward position and a one-third forward position, but activation event level is high. Here, the algorithm activates the inflator 18 to have a high inflation level (e.g., produces 100% of the inflation gas). Thus, in this instance the air bag module 14 ignites both the first and second generators of the inflator 18. The inflation input 122 is equal to 70% because the quantity of inflation gas from the inflator 18 is 100% and the amount directed by venting system 54 is 70% (e.g., 70%×100%). Again, the bag volume index 124 is 87%. Therefore, the deployment scenario 132 provides an air bag pressure index 128 equal to 80% (e.g., 70%÷87%).

In deployment scenario 133, the seat belt is not in use, the activation event level is low, and seating structure 12 is between a full forward position and a one-third forward position. Here, the algorithm activates the inflator 18 at a low inflation level (e.g., produces 80% of the inflation gas). Thus, in this instance the air bag module 14 ignites only the propellant of second housing 40 of the inflator 18. The inflation input 122 is equal to 56% because the quantity of inflation gas from the inflator 18 is 80% and the amount directed by venting system 54 is 70% (e.g., 70%×80%). Again, the bag volume index 124 is 87%. Therefore, deployment scenario 133 provides an air bag pressure index 128 equal to 64% (e.g., 56%÷87%).

In deployment scenario 134, the seat belt is not in use, the activation event level is high, and seating structure 12 is between a full forward position and a one-third forward position. Here, the algorithm activates the inflator 18 at a high inflation level (e.g., produces 100% of the inflation gas). Thus, in this instance the air bag module 14 ignites both the propellant of both the first and the second housings of the inflator 18. The inflation input 122 is equal to 70% because the quantity of inflation gas from the inflator 18 is 100% and the amount directed by venting system 54 is 70% (e.g., 70%×100%). Again, the bag volume index 124 is 87%. Therefore, deployment scenario 134 provides an air bag pressure index 128 equal to 80% (e.g., 70%÷87%).

In deployment scenario 135, the seat belt is in use, the activation event level is low, and seating structure 12 is between a one-third forward position and a full rearward position. Here, the algorithm activates initiating device 76 to close the vent 58 and to release the releasable element 68, while the inflator 18 is configured to be at a low inflation level (e.g., produces 80% of the inflation gas). Thus, in this instance the air bag module 14 ignites the propellant of second housing 40 of the inflator 18, and initiating device 76. The inflation input 122 is equal to 80% because the quantity of inflation gas from the inflator 18 is 80% and the amount directed by venting system 54 is 100% (e.g., 100%×80%). Here, the bag volume index 124 is 100% since the variable tether system 60 is activated (e.g., released). Therefore, deployment scenario 135 provides an air bag pressure index 128 equal to 80% (e.g., 80%÷100%).

In deployment scenario 136, the seat belts are in use, the activation event level is high, and seating structure 12 is between a one-third forward position and a full rearward position. Here, the algorithm activates initiating device 76 to close the vent 58 and to release the releasable element 68. In addition, the algorithm activates the inflator 18 at a high inflation level (e.g., produces 100% of the inflation gas). Thus, in this instance the air bag signals are provided to ignite both the first and second generators, and initiating device 76. The inflation input 122 is equal to 100%, because the quantity of inflation gas from the inflator 18 is 100% and the amount directed by venting system 54 is 100%. Again, the bag volume index 124 are 100%. Therefore, deployment scenario 136 provides an air bag pressure index 128 equal to 100% (e.g., 100%÷100%).

In deployment scenario 137, the seat belts are not in use, the activation event level is low, and seating structure 12 is between a one-third forward position and a full rearward position. Here, the algorithm activates initiating device 76 to close the vent 58 and to release the releasable element 68, while the inflator 18 is activated to provide a low inflation level (e.g., produces 80% of the inflation gas). Thus, in this instance the propellant of second housing 40 of the inflator 18 is ignited as well as initiating device 76. The inflation input 122 is equal to 80% because the quantity of inflation gas from the inflator 18 is 80% and the amount directed by venting system 54 is 100%. Again, the bag volume index 124 is 100%. Therefore, deployment scenario 137 provides an air bag pressure index 128 equal to 80% (e.g., 80%÷100%).

In deployment scenario 138, the seat belts are not in use, the activation event level is high, and seating structure 12 is between a one-third forward position and a full rearward position. Here, the algorithm activates initiating device 76 to close the vent 58 and to release the releasable element 68, while also activating the inflator for a high inflation level (e.g., produces 100% of the inflation gas). Thus, in this instance the first generator, the second generator, and the initiating device 76 are ignited. The inflation input 122 is equal to 100% because the quantity of inflation gas from the inflator 18 and the amount directed by venting system 54 are 100%. Again, the bag volume index 124 is 100%. Therefore, deployment scenario 138 provides an air bag pressure index 128 equal to 100% (e.g., 100%÷100%).

An alternative embodiment of the control algorithm of the present disclosure is illustrated in FIG. 6. FIG. 6 illustrates how the algorithm adapts the air bag pressure index 128 to the various conditions being sensed. In this embodiment, the dual stage inflator 18, the variable venting system 54, and the variable tether system 60 have ratios different from those described with respect to FIG. 5.

Specifically, the dual stage inflator 18 is adapted to provide about 85% of the inflator gas under the low inflation levels (e.g., ignition of only the propellant of the second housing 40) and to provide 100% of the inflator gas under the high inflation conditions (e.g., ignition of the propellant of both the first and second generators). The variable inflator vent system 54 is configured to allow about 70% of the generated inflator gas to be directed to the cushion when vent openings 56 are open, and about 100% when the vent-blocking-device 58 covers the openings 56. The variable tether system 60 provides about 78% of the cushion 20 depth when the tether-blocking-device 88 abuts the retaining stud 104, and about 100% of the cushion 20 depth when the tether-blocking-device 88 is released from the retaining stud 104.

In deployment scenario 131 of FIG. 6, the amount to be directed to the cushion is 70% but the quantity of gas generated is zero. Thus, the inflation input 122 is equal to zero. The bag volume index 124 is 78% since the variable tether system 60 is not released. Therefore, in deployment scenario 131 provides an air bag pressure index 128 equal to zero (e.g., 0%÷78%).

In deployment scenarios 132 and 134 of FIG. 6, the quantity of inflation gas from the inflator 18 is 100% and the amount directed by venting system 54 is 70%. Thus, the inflation input 122 is equal to 70%. Again, the bag volume index 124 is 78%. Therefore, deployment scenario 132 provides an air bag pressure index 128 equal to 89% (e.g., 70%÷78%).

In deployment scenario 133 of FIG. 6, the quantity of inflation gas from the inflator 18 is 85% and the amount directed by venting system 54 is 70%. Thus, the inflation input 122 is equal to 59%. The bag volume index 124 is 78%. Therefore, deployment scenario 133 provides an air bag pressure index 128 equal to 76% (e.g., 59%÷78%).

In deployment scenarios 135 and 137 of FIG. 6, the quantity of inflation gas from the inflator 18 is 85% and the amount directed by venting system 54 is 100%. Thus, the inflation input 122 is equal to 85% (e.g., 100%×85%). Here, the bag volume index 124 is 100% since the variable tether system 60 is released. Therefore, deployment scenario 135 provides an air bag pressure index 128 equal to 85% (e.g., 85%÷100%).

In deployment scenarios 136 and 138 of FIG. 6, the inflation input 122 is equal to 100% since the quantity of inflation gas from the inflator 18 is 100% and the amount directed by venting system 54 is 100%. Again, the bag volume index 124 are 100%. Therefore, deployment scenario 136 provides an air bag pressure index 128 equal to 100% (e.g., 100%÷100%).

It should be recognized that the control algorithm is resident upon a microcontroller located in the vehicle. The microcontroller may be the same unit used to control or operate the sensing and diagnostic module. In addition, the control algorithm is capable of being operated independently of the sensing and diagnostic module as well as simultaneously.

As provided by example above, air bag module 14 as controlled by algorithm 112 provides for at least five discrete levels of air bag pressures index 128 that are tailored to specific conditions encountered. In the first example, the discrete levels include air bag pressures indexes 128 of zero at deployment condition 131, sixty four percent at deployment condition 133, eighty percent at deployment conditions 132, 134, 135, and 137, and one hundred percent at deployment conditions 136 and 138. However, in the second example, the discrete levels include air bag pressures indexes 128 of zero at deployment condition 131, eighty-nine percent at deployment conditions 132 and 134, seventy-six percent at deployment condition 133, eighty-five percent at deployment conditions 135 and 137, and one hundred percent at deployment conditions 136 and 138.

The algorithm provides a simple, inexpensive, and reliable way to tailor the inflatable cushion 20 to the sensed conditions. The discrete levels of air bag pressure 128 are provided with a dual stage inflator 18, a variable tether system 60, and a variable venting system 54. The control algorithm 112 activates the two stages of the inflator as well as the variable tether and venting systems depending on the sensed conditions. The control algorithm 112 does not require a complex logic tree or multiple control signals during the activation event to integrate the air bag pressures 128 to the activation event level.

Algorithm 112 selects a discrete inflation level using conventional vehicle inputs such as seat position, seat belt usage, and activation event level to customize the air bag inflation pressure 128 to the various conditions and/or scenarios. When the seating structure 12 is away from the air bag module 14 (e.g., rear position), the air bag module activates the variable venting system 54 and the variable tether system 60 to ensure that all of the gas generated by the dual stage inflator 18 goes to air bag and that tether is extended. However, when the seating structure 12 close to the air bag module 14, the air bag module does not activate the variable venting system 54 or the variable tether system 60 to ensure that some of the gas generated by the dual stage inflator is vented away from the cushion 20 and that tether is restrained. In other words, when the seating structure 12 is close to the air bag module 14, the cushion is shallower with less pressure, but when the seating structure 12 is far from the air bag module 14, the cushion is deeper and fuller. By enabling two air bag profiles 62 and 64, two inflation venting conditions, and two quantities of generated inflation gas, the air bag module 14 provides depths and pressures that are more closely tied to the conditions encountered.

An alternative embodiment of a control algorithm 212 of the present disclosure is illustrated in FIG. 7. FIG. 7 illustrates how the algorithm adapts the air bag pressure index 228 to the various conditions being sensed. In this embodiment, the inflator 18 is a single stage inflator capable of generating 100% of the inflation gas at all times. Here, the variable venting system 54, and the variable tether system 60 have ratios different from those described with respect to FIGS. 5 and 6.

Specifically, the inflator 18 is adapted to provide about 100% of the inflator gas under the all inflation conditions. The variable inflator vent system 54 is configured to allow about 80% of the generated inflator gas to be directed to the cushion when vent openings 56 are open, and about 100% when the vent-blocking-device 58 covers the openings 56. The variable tether system 60 provides about 87% of the cushion 20 volume when the tether-blocking-device 88 abuts the retaining stud 104, and about 100% of the cushion 20 volume when the tether-blocking-device 88 is released from the retaining stud 104.

Accordingly, the result of the control algorithm 212 is the deployment of the air bag module 14 in such a manner to adapt or customize the air bag pressure index 228 to a desired level that is based in part on seat position, seat belt usage, and activation event level. In the example of FIG. 7, the control algorithm 212 results in eight different deployment scenarios, each having an air bag pressure index 228 commensurate in magnitude to the seat position, seat belt usage, and activation event level.

Specifically, decision node 213 makes its decision based on the various inputs including the position of seating structure 12. The inputs are detected and inputted into the algorithm by seat position sensor 26, optical scanner 28, seat recline sensor 32, and/or combinations thereof.

For example, if seating structure 12 is between a full forward position and a one-third forward position (e.g., if the seating structure is close to the air bag module 14), then decision node 213 does not activate the variable vent system 54 and the variable tether system 60. In this instance, the variable venting system 54 directs 80% of the generated inflation gas, and the releasable element 68 retrains the cushion to the first expanded state 62. Thus, less inflation gas is provided to the cushion 20 and the cushion is retained to protrude into the vehicle 10 to a lesser degree than provided by the second expanded state 64.

However, if the seating structure 12 is between a one-third forward position and a full rearward position (e.g., if the seating structure is further away from the air bag module 14), then the decision node 213 waits to determine the activation state of the variable vent system 54 and variable tether system 60.

Next or simultaneously, the control algorithm 212 determines whether the seat belt structures are secured (e.g., buckled is inserted into its corresponding clasp). Specifically, a decision node 216 or 217 depending on the result of node 213 determines whether the seat belts are secured. This determination is made by the inputs received from the seat belt detection sensors 34.

Then or simultaneously, control algorithm 212 determines at a corresponding decision node 218 or 219 whether the activation event detected by the sensing-and-diagnostic module 22 is a high activation event level or a low activation event level.

At decision node 218, the control algorithm 212 determines whether or not to activate the inflator 18. If the activation event level at decision node 218 is low, and the condition at decision node 216 is belted, then decision node 218 does not activate the inflator. However, if the activation event level at decision node 218 is high, and the condition at decision node 216 is belted, then decision node 218 activates the inflator. Similarly, if the activation event level at decision node 218 is high or low, and the condition at decision node 216 is un-belted, then decision node 218 activates the inflator.

At decision node 219, the control algorithm 212 determines whether to activate the variable vent system 54 and the variable tether system 60. If the activation event level at decision node 219 is high, then decision node 219 activates the variable vent system 54 and the variable tether system 60. In this instance the variable venting system 54 directs 100% of the generated inflation gas to the cushion, and the releasable element 68 releases the cushion to the second expanded state 64. Thus, more inflation gas is provided to the cushion 20 and the cushion is has a deeper volume than provided by the first expanded state 62.

However, if the activation event level at decision node 219 is low, then decision node 219 does not activate the variable vent system 54 and the variable tether system 60. In this instance, the variable venting system 54 directs 80% of the generated inflation gas, and the releasable element 68 retrains the cushion to the first expanded state 62. Thus, less inflation gas is provided to the cushion 20 and the cushion is retained to protrude into the vehicle 10 to a lesser degree than provided by the second expanded state 64.

Control algorithm 212 provides the inputs or signals to the air bag module to provide the inflation level corresponding to the results of decision nodes 213 and 216–219. Namely, the algorithm determines whether or not to activate the inflator and whether or nor to activate the variable venting system 54 and the variable tether system 60. Accordingly, the inflation level is based on seat belt usage, the activation event, and position of seating structure 12.

Accordingly, the control algorithm controls the activation of the air bag module 14 to provide three discrete inflation input levels (0%, 80%, and 100%).

Deployment scenarios 231–238 are each described below with respect to their resultant air bag pressure indexes 228. Deployment scenarios 231–234 represent the output when the first decision node 213 does detect the seat position to be greater than one-third forward. Deployment scenarios 235–238 represent the output when the first decision node 213 does not detect the seat position to be greater than one-third forward.

Referring back now to deployment scenario 231, the same relates to the following inputs: seat belt in use, low activation event level, and seating structure 12 is between a full forward position and a one-third forward position. Here, the algorithm does not activate the inflator 18, the variable vent system 54 or the variable tether system 60. The inflation input 222 is equal to zero because the amount to be directed to the cushion is 80% but the quantity of gas generated is zero (e.g., 80%×0%). The bag volume index 124 is 87% since the variable tether system 60 is not released. Therefore, deployment scenario 231 provides an air bag pressure index 228 equal to zero (e.g., 0%÷87%).

In deployment scenario 232, the same relates to the following inputs: seat belt in use, seating structure 12 is between a full forward position and a one-third forward position, but activation event level is high. Here, the algorithm activates the inflator 18, but does not activate the variable vent system 54 or the variable tether system 60. Thus, inflation input 222 is equal to 80% because the quantity of inflation gas from the inflator 18 is 100% and the amount directed by venting system 54 is 80% (e.g., 80%×100%). The bag volume index 224 is 87%. Therefore, the deployment scenario 232 provides an air bag pressure index 228 equal to 92% (e.g., 80%÷87%).

In deployment scenario 233, the same relates to the following inputs: seat belt not in use, seating structure 12 is between a full forward position and a one-third forward position, and a low activation event level. Here, the algorithm activates the inflator 18, but does not activate the variable vent system 54 or the variable tether system 60. Thus, the deployment scenario 233, like deployment scenario 232 above, provides an air bag pressure index 228 equal to 92% (e.g., 80%÷87%).

In deployment scenario 234, the same relates to the following inputs: seat belt not in use, seating structure 12 is between a full forward position and a one-third forward position, and a high activation event level. Here, the algorithm activates the inflator 18, but does not activate the variable vent system 54 or the variable tether system 60. Thus, the deployment scenario 234, like deployment scenarios 232 and 233 above, provides an air bag pressure index 228 equal to 92% (e.g., 80%÷87%).

In deployment scenario 235, the same relates to the following inputs: seat belt in use, seating structure 12 is between a one-third forward position and a full rearward position, and a low activation event level. Here, the algorithm activates the inflator 18, but does not activate the variable vent system 54 or the variable tether system 60. Thus, the deployment scenario 235, like deployment scenarios 232–234 above, provides an air bag pressure index 228 equal to 92% (e.g., 80%÷87%).

In deployment scenario 236, the same relates to the following inputs: seat belt in use, seating structure 12 is between a one-third forward position and a full rearward position, and a high activation event level. Here, the algorithm activates the inflator 18, the variable vent system 54, and the variable tether system 60. Thus, inflation input 222 is equal to 100% because the quantity of inflation gas from the inflator 18 is 100% and the amount directed by venting system 54 is 100% (e.g., 100%×100%). The bag volume index 224 is 100%. Therefore, the deployment scenario 236 provides an air bag pressure index 228 equal to 100% (e.g., 100%÷100%).

In deployment scenario 237, the same relates to the following inputs: seat belt in not use, seating structure 12 is between a one-third forward position and a full rearward position and a low activation event level. Here, the algorithm activates the inflator 18, but does not activate the variable vent system 54 or the variable tether system 60. Thus, the deployment scenario 235, like deployment scenarios 232–235 above, provides an air bag pressure index 228 equal to 91% (e.g., 80%÷87%).

In deployment scenario 238, the same relates to the following inputs: seat belt in not use, seating structure 12 is between a one-third forward position and a full rearward position, and a high activation event level. Here, the algorithm activates the inflator 18, the variable vent system 54, and the variable tether system 60. Thus, the deployment scenario 235, like deployment scenario 236 above, provides an air bag pressure index 228 equal to 100% (e.g., 100%÷100%).

As provided by example above, air bag module 14 as controlled by algorithm 212 provides for three discrete levels of air bag pressures index 228 that are tailored to specific conditions encountered. In the example provided, the discrete levels include air bag pressures indexes 228 of zero at deployment condition 231, ninety-one percent at deployment conditions 232–235 and 237, and one hundred percent at deployment conditions 236 and 238.

The algorithm provides a simple, inexpensive, and reliable way to tailor the inflatable cushion 20 to the sensed conditions. The discrete levels of air bag pressure 228 are provided with a single stage inflator 18, a variable tether system 60, and a variable venting system 54. The control algorithm 212 activates the inflator as well as the variable tether and venting systems depending on the sensed conditions. The control algorithm 212 does not require a complex logic tree or multiple control signals during the activation event to integrate the air bag pressures 228 to the activation event level.

Algorithm 212 selects a discrete inflation level using conventional vehicle inputs such as seat position, seat belt usage, and activation event level to customize the air bag inflation pressure 228 to the various conditions and/or scenarios.

It should also be noted that the terms "first", "second", and "third", and the like may be used herein to modify elements performing similar and/or analogous functions. These modifiers do not imply a spatial, sequential, or hierarchical order to the modified elements unless specifically stated.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An air bag pressure control system for use in a vehicle having a seating structure, comprising:

a housing being configured for installment in the vehicle;

an inflatable cushion stored in an un-deployed position in said housing, said inflatable cushion being configured for deployment towards the seating structure;

a dual stage inflator in fluid communication with said inflatable cushion, said dual stage inflator being configured to generate a quantity of inflation gas being in a range defined by a first quantity of inflation gas and a second quantity of inflation gas to deploy said inflatable cushion from said housing towards the seating structure;

a vent opening formed in said housing, said vent opening being configured to allow a portion of said first quantity of inflation gas or a portion of said second quantity of inflation gas to vent away from said inflatable cushion;

a sensing and diagnostic module for detecting an activation event level;

a control algorithm adapted to tailor an inflation level of said inflatable cushion during deployment by controlling said dual stage inflator to generate either said first quantity of inflation gas or said second quantity of inflation gas, and by controlling a tether element releasably secured to an activation mechanism to selectively retain said inflatable cushion in a profile being in a range defined by a first expanded profile and a second expanded profile, by manipulating said activation mechanism between a first position and a second position, said activation mechanism being configured to allow said portion to vent away from said inflatable cushion through said vent opening and to retain said inflatable cushion in said first expanded profile at said first position and said activation mechanism being configured to direct said portion towards said inflatable cushion and to release said inflatable cushion to said second expanded profile by releasing said tether element as said activation mechanism moves towards said second position; and wherein said control algorithm is configured to select said inflation level from at least five discrete inflation levels.

2. The air bag pressure control system as in claim 1, wherein said actuation mechanism is moved from said first position to said second position by an initiating device.

3. The air bag pressure control system as in claim 2, wherein said initiating device is a pyrotechnic squib or a pneumatic actuator.

4. The air bag pressure control system as in claim 1, wherein said control algorithm tailors said inflation level of said inflatable cushion during deployment according to said activation event level, a seat position, and usage of a seat belt.

5. An air bag pressure control system for use in a vehicle having a seating structure with a seat belt, comprising:

a housing being configured for installment in the vehicle;

an inflatable cushion stored in an un-deployed position in said housing, said inflatable cushion being configured for deployment towards the seating structure;

a dual stage inflator stored in fluid communication with said inflatable cushion, said dual stage inflator being configured to generate a quantity of inflation gas being in a range defined by a first quantity of inflation gas and a second quantity of inflation gas to deploy said inflatable cushion from said housing towards the seating structure;

a vent opening being formed in said housing, said vent opening being configured to allow a portion of said first quantity of inflation gas or a portion of said second quantity of inflation gas to vent away from said inflatable cushion;

a sensing and diagnostic module for detecting an activation event level;

a control algorithm adapted to tailor an inflation level of said inflatable cushion during deployment by controlling said dual stage inflator to generate either said first quantity of inflation gas or said second quantity of inflation gas and by controlling a tether element releasebly secured to an activation mechanism to selectively retain said inflatable cushion in a profile being in a range defined by a first expanded profile and a second expanded profile, by manipulating said activation mechanism between a first actuation position and a second actuation position, said activation mechanism being configured to allow said portion to vent away from said inflatable cushion through said vent opening and to retain said inflatable cushion in said first expanded profile at said first actuation position and said activation mechanism being configured to direct said portion towards said inflatable cushion and to release said inflatable cushion to said second expanded profile by releasing said tether element as said activation mechanism moves towards said second actuation position;

wherein said sensing and diagnostic module detects a seat position of the seating structure with respect to said housing and whether the seat belt is in a belted state or an un-belted state;

wherein said activation event level being in a range defined by a high level and a low level, said seat position being in a range defined by a first position and a second position with respect to said housing; and wherein said control algorithm provides:

a first discrete inflation level if said event level is said low level, said seat position is said first position, and said seat belt is in said belted state;

a second discrete inflation level if said event level is said high level, said seat position is said first position, and said seat belt is in either said belted state or said un-belted state;

a third discrete inflation level if said event level is said low level, said seat position is said first position, and said seat belt usage is said un-belted state;

a fourth discrete inflation level if said event level is said low level, said seat position is said second position, and said seat belt usage is either said belted state or said un-belted state; and a fifth discrete inflation level if said event level is said high level, said seat position is said second position, and said seat belt usage is either said belted state or said un-belted state.

6. The air bag pressure control system as in claim 5, wherein said first discrete inflation level is zero.

7. The air bag pressure control system as in claim 5, wherein said second discrete inflation level is provided by said dual stage inflator generating said second quantity of inflation gas, said vent opening diffusing said portion away from said inflatable cushion, and said tether element retaining said inflatable cushion in said first expanded profile.

8. The air bag pressure control system as in claim 5, wherein said third discrete inflation level is provided by said dual stage inflator generating said first quantity of inflation gas, said vent opening diffusing said portion away from said inflatable cushion, and said tether element retaining said inflatable cushion in said first expanded profile.

9. The air bag pressure control system as in claim 5, wherein said fourth discrete inflation level is provided by said dual stage inflator generating said first quantity of inflation gas, said activation mechanism diffusing said portion towards said inflatable cushion, and said tether element releasing said inflatable cushion to said second expanded profile.

10. The air bag pressure control system as in claim 5, wherein said fifth discrete inflation level is provided by said dual stage inflator generating said second quantity of inflation gas, said activation mechanisms diffusing said portion towards said inflatable cushion, and said tether element releasing said inflatable cushion to said second expanded profile.

11. The air bag pressure control system as in claim 5, wherein said second position of said seat is further away from said housing than said first position of said seat.

12. A method for varying the inflation input of an inflatable cushion of an airbag module comprising: a housing; an inflatable cushion; a dual stage inflator in fluid communication with the inflatable cushion, the dual stage inflator being configured to generate a quantity of inflation gas being in a range defined by a first quantity of inflation gas and a second quantity of inflation gas in order to deploy the inflatable cushion from the housing during an activation event, the second quantity being greater than the first quantity; a vent opening in the housing, the vent opening being positioned to allow a portion of either the first quantity of inflation gas or the second quantity of inflation gas to vent away from the inflatable cushion; and a variable tether system being configured to either restrain the expansion of the inflatable cushion or allow unrestrained expansion of the inflatable cushion, wherein actuation of the variable tether system to allow unrestrained expansion of the inflatable cushion causes a vent blocking device to block the vent opening in the housing, the method comprising:
    determining if a seat is in either a first position or a second position, said first position being closer to the airbag module;
    determining if a seat belt of said seat is buckled;
    determining if the inflator is to be activated in accordance with an activation event to generate either the first quantity of inflation gas or the second quantity of inflation gas; and
    selecting from one of at least five inflation profiles, wherein each of said inflation profiles is defined by a combination of: the quantity of inflation gas generated; restraint of the expansion of the inflatable cushion by the variable tether system or unrestrained expansion of the inflatable cushion by the variable tether system; and blocking of the vent opening or unblocking of the vent opening.

13. The method as in claim 12, wherein blocking of the vent opening is achieved by manipulating a vent blocking device into a vent blocking position by activating a pyrotechnic squib.

14. An inflatable restraint system for a vehicle having a seat with a seat belt, comprising:
    an airbag module comprising: a housing; an inflatable cushion, said inflatable cushion being configured for deployment out of said housing; a dual stage inflator in fluid communication with said inflatable cushion, said dual stage inflator being configured to generate a first inflation output and a second inflation output for deploying said inflatable cushion, said first inflation output being less than said second inflation output; a vent opening disposed in said housing, said vent opening being positioned to allow a portion of either said first inflation output or said second inflation output to vent away from said inflatable cushion; and a variable tether system being configured to either restrain the expansion of the inflatable cushion in at least one direction or to allow unrestrained expansion of the inflatable cushion, wherein actuation of the variable tether system to allow unrestrained expansion of the inflatable cushion causes a vent blocking device to block the vent opening in the housing;
    a control algorithm for determining how to tailor the deployment of said inflatable cushion during an activation event, wherein said control algorithm tailors the deployment of said inflatable cushion by providing one of at least five inflation outputs to said inflatable cushion by:
        determining if the seat is in either a first position or a second position, said first position being closer to the airbag module;
        determining if the seat belt of the seat is buckled;
        determining if said dual stage inflator is to be activated and whether to activate said dual stage inflator at either said first inflation output or said second inflation output and determining if said variable tether system is to restrain the expansion of said inflatable cushion; and
    wherein activation of said dual stage inflator to generate either said first inflation output or said second inflation output and restraint of the expansion of said inflatable cushion is determined by the severity of the activation event, the position of the seat and whether the seat belt is buckled.

15. The inflatable restraint system as in claim 14, wherein said variable tether system comprises a tether having a first end and a second end, said first end being secured to an inner surface of the inflatable cushion and the second end being secured to an actuatable member having said vent blocking device secured thereto, said actuatable member being configured for movement between a first position and a second position, wherein a length of said tether limits the deployment of said inflatable cushion in at least one direction when said second end is retained by said actuatable member and actuation of said actuatable member from said first position to said second position releases said second end and said vent blocking device is positioned to block said vent opening when said actuatable member moves from said first position to said second position.

16. A method for providing one of at least five inflation outputs to an inflatable cushion of an airbag module disposed proximate to a seat of a vehicle, the seat having a seat belt and the airbag module having an inflator for inflating the inflatable cushion, the method comprising:
    determining the position of the seat relative to the airbag module;
    determining if the seat belt of said seat is buckled;
    determining the severity of an inflator activation event;
    determining if the inflator is to be activated in accordance with the activation event and whether to generate either a first quantity of inflation gas or a second quantity of inflation gas, the second quantity of inflation gas being greater than the first quantity of inflator gas;
    determining whether to release a restraining tether secured to a portion of the inflatable cushion, wherein release of the restraining tether causes a vent opening of the airbag module to be blocked; and
    providing one of the at least five inflation outputs, wherein the provided inflation output is defined by a combination of: the quantity of inflation gas generated; release of the restraining tether; and blocking of the vent opening.

* * * * *